United States Patent Office 2,855,317
Patented Oct. 7, 1958

2,855,317

CERAMICS

Malcolm C. McQuarrie, State College, Pa., and Frank G. Recny, Adams, Mass., assignors to Sprague Electric Company, North Adams, Mass., a corporation of Massachusetts No Drawing. Application October 15, 1954
Serial No. 462,604

4 Claims. (Cl. 106—39)

This invention relates to high dielectric constant ceramics and more particularly to titanate-containing ceramic bodies with minor amounts of columbium oxide.

This is a continuation-in-part of our copending United States patent application, Serial No. 399,619, filed December 21, 1953.

Barium titanate and other titanates have recently become highly valuable for use in forming ceramic bodies of extremely high dielectric constant. To these materials which include, for example, lead, calcium and strontium titanates, many materials have been added in an effort to improve their electrical characteristics, particularly to minimize the temperature coefficient of dielectric constant. Included among these many additives are sodium and potassium columbate. With these materials, however, a substantial decrease in temperature coefficient of dielectric constant of a restricted operational range could be obtained only at the expense of reducing the dielectric constant. None of the additives have to our knowledge yielded satisfactory products having low temperature coefficients of dielectric constant without adversely affecting the dielectric constant. Even more important is the failure of prior art high dielectric constant ceramics to exhibit high dielectric constant in combination with improved leakage resistance and breakdown strength.

It is therefore an object of this invention to produce a novel ceramic dielectric exhibiting a substantially increased dielectric constant. A still further object is to produce a high dielectric constant ceramic exhibiting high leakage resistance and low temperature coefficient of dielectric constant. Other objects of this invention will be apparent from the following specification.

The objects have been achieved by addition of an effective amount up to about 0.5% of columbium oxide in a high dielectric constant titanate body of the barium titanate type. These additions result in unexpectedly beneficial changes in the electrical properties. For example, the dielectric constant is increased by factors of 10% to 20%, the leakage resistance is improved, resistance to the electrolysis at high temperatures is enhanced, the breakdown strength is much higher, power factors of less than 1% are obtained, and the temperature coefficient of dielectric constant is low. The reason for the exceptional characteristics of our new body is not fully understood although it is believed that the addition of minor amounts of columbium oxide up to about 0.5% compensates for the presence of the trivalent titanium ions in the ceramic body. Additions of the pentavalent columbium ion, which has an atomic volume substantially that of titanium, either drives the equilibrium of the equation between the tetravalent and trivalent titanium ions, $Ti^{+4}+e \rightleftharpoons Ti^{+3}$, to the left, or in entering into the crystalline lattice compensates for the presence of holes resulting from the trivalent ion. It is further believed that, in commercial barium-titanate-containing ceramic bodies, numerous trivalent ions of appropriate atomic volume must also be compensated for by the addition of the pentravalent ion. Such trivalent ions present as impurities include iron, aluminum, chromium, all believed capable of entering into the crystalline lattice and exerting a deleterious influence. Our bodies have been found to have truly remarkable electrical characteristics hitherto unachieved in this crowded field of endeavor.

The range of additions which provoke this unique set of electrical properties are effective amounts up to about 0.5% by weight of columbium oxide to the high dielectric constant ceramic body. Within this range it has been found that for the usual commercial formulations from which bodies of dielectric constants in excess of 1000 are produced, the optimum addition is about 0.25% by weight. By such commercial compositions is meant commercially available grades of barium titanate, strontium titanate, etc. with other compounds as barium carbonate, zirconium salts, titania, etc. added to produce a body of particular characteristics. For barium titanate bodies which are substantially pure, that is, the chemically pure grade, additions of from about 0.01% to about 0.1% are found to exert such an influence on the body as to produce the composite structure having outstanding electrical characteristics.

As indicated above, the high dielectric constant bodies to which the additions are made are restricted to those titanates including barium, calcium, strontium, and lead salts singly or in combination, which produce high dielectric constant bodies (i. e., those bodies having a dielectric constant within the range of from 1000 to values above 9000). Barium titanate either singly or in combination with minor amounts of added ingredients including other titanate and zirconate salts, have the superior electrical characteristics and thus are preferred for general applications when modified advantageously by an addition of the columbium oxide in the range disclosed herein.

To specifically exemplify our invention, a number of bodies were produced by varying the percentage by weight of columbium oxide added to a predominately barium titanate formulation. Amounts added ranged from 0.06% to 0.5% on two different formulations of commercially available barium titanate modified by addition of zirconates. The ingredients were weighed and wet ball milled for 12 hours after which a binder of 8% by weight of wax was dispersed throughout. From this mixture disks of 0.675" diameter were pressed under a pressure of 9500 lbs. per square inch and fired at 2300 and 2650° F. for a period of about one hour. The following table gives electrical properties of these compositions, determined after screening silver electrodes on opposed faces of the disks, followed by firing at 750° C. for 15 minutes.

Table I

| Composition A | Percent by Weight | Composition B | Percent by Weight |
|---|---|---|---|
| $BaTiO_3$ | 85.4 | $BaTiO_3$ | 84.1 |
| $CaZrO_3$ | 9.8 | $CaZrO_3$ | 14.8 |
| $SrZrO_3$ | 3.9 | Impurities (Same as A) | 1.1 |
| Impurities ($Al_2O_3$, $Fe_2O_3$, $CuO$, $MgO$, $Sb_2O_3$) | 1.1 | | |

| Sample | Composition | Percent $Cb_2O_5$ | Firing Temp., ° F. | K |
|---|---|---|---|---|
| 1 | A | 0.25 | 2,530–2,600 | 6,708 |
| 2 | A | 0.50 | 2,530–2,600 | 5,971 |
| 3 | A | 1.0 | 2,530–2,600 | 1,216 |
| 4 | B | 0.0624 | 2,530–2,600 | 5,247 |
| 5 | B | 0.125 | 2,530–2,600 | 5,434 |
| 6 | B | 0.25 | 2,530–2,600 | 5,924 |
| 7 | B | 1.0 | 2,400–2,500 | 1,700 |

As is evident from the data in the table, additions of amounts over about 0.50% columbium oxide result in an extremely adverse effect on the dielectric constant. Furthermore, it has been found that the addition of small amounts of columbium oxide results in a significant improvement in breakdown strength, the improvement being in some instances as much as 50%. For example, with Composition A, addition of as little as 0.25% columbium oxide improves the power factor value by 10%. Also, such addition yields a product of remarkably improved resistance to electrolysis. For example, the leakage resistance (determined by maintenance at 85° C. for 400-700 hours) of Composition A material containing 0.25% columbium oxide is 12,000 megohms, whereas that of a sample containing no added oxide is only 1,750 megohms.

For a substantial increase of dielectric constant, an improvement of the leakage resistance, increased resistance to electrolysis at high temperatures, improved breakdown strength and substantially low temperature coefficient capacitance of high dielectric constant titanate containing ceramic bodies, the oxide of columbium must be added in an effective amount up to about 0.5% by weight. Amounts of the oxide even as low as 0.01% have been found to yield improved properties. Uranium oxides may also be added in minor amounts to these high dielectric constant bodies to effect improved electrical characteristics, which however, is not as marked as with the columbium oxide.

Our disclosed compositions have utility in all electrical applications which high dielectric constant, low loss, exceptional breakdown strength, resistance to high temperatures and excellent temperature coefficient of dielectric constants are required. Further, our bodies are particularly applicable to printed circuitry and miniature capacitors subjected to exceptional voltage stress.

While we have described what we believed will be the best embodiments of our invention we do not wish, however, to be confined to the embodiments shown, but what we desire to cover by Letters Patent is set forth in the appended claims.

What is claimed is:

1. A composition having 0.1% by weight of columbium oxide, the balance being essentially barium titanate.

2. A composition consisting essentially of about 85.4% barium titanate, about 9.8% calcium zirconate, and about 3.9% strontium zirconate, all by weight said composition having from 0.01 to 0.5% by weight of columbium oxide added.

3. A composition consisting essentially of about 84.1% by weight of barium titanate and about 14.8% by weight of calcium zirconate, said composition having from 0.01 to 0.5% by weight of columbium oxide added.

4. A high dielectric constant barium titanate ceramic modified by the addition of columbium oxide in an amount from about 0.01% to about 0.5% by weight.

References Cited in the file of this patent

UNITED STATES PATENTS 2,646,359    Wainer _____ July 21, 1953